(12) United States Patent
McInnis et al.

(10) Patent No.: US 6,280,561 B1
(45) Date of Patent: Aug. 28, 2001

(54) HOT MELT ADHESIVES COMPRISING LOW FREE MONOMER, LOW OLIGOMER ISOCYANATE PREPOLYMERS

(75) Inventors: Edwin Lee McInnis, Allentown; Thomas Michael Santosusso, Macungie; Jeffrey Raymond Quay, Kutztown, all of PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 0 days.

(21) Appl. No.: 09/213,479

(22) Filed: Dec. 17, 1998

Related U.S. Application Data

(63) Continuation of application No. 08/707,832, filed on Sep. 6, 1996, now abandoned.

(51) Int. Cl.$^7$ .................................................. C09J 5/00
(52) U.S. Cl. .................. 156/305; 156/331.4; 525/453; 528/59
(58) Field of Search ................... 156/331.4, 305; 525/453; 528/59

(56) References Cited

U.S. PATENT DOCUMENTS

| | | |
|---|---|---|
| 3,384,624 | 5/1968 | Heiss ........................ 528/59 |
| 3,931,077 | 1/1976 | Uchigaki et al. . |
| 4,169,175 | 9/1979 | Marans et al. ............ 528/59 |
| 4,585,819 | 4/1986 | Reischle et al. . |
| 4,623,709 | 11/1986 | Bauriedel . |
| 4,775,719 | 10/1988 | Markevka et al. . |
| 4,808,255 | 2/1989 | Markevka et al. . |
| 4,820,368 | 4/1989 | Markevka et al. . |
| 4,961,377 | 10/1990 | Bando et al. .............. 156/331.4 |
| 5,075,407 | 12/1991 | Cody et al. .............. 525/453 |
| 5,441,808 | 8/1995 | Anderson et al. . |
| 5,705,547 | 1/1998 | Richards et al. .......... 528/59 |
| 5,994,493 | 11/1999 | Krebs ........................ 156/331.4 |
| 6,020,429 | * 2/2000 | Yang et al. ................ 525/453 |

FOREIGN PATENT DOCUMENTS

| | | |
|---|---|---|
| 0386879 | 9/1990 | (EP) . |
| 0511566 | 11/1992 | (EP) . |
| 0668302 | 8/1995 | (EP) . |
| 3-207782 | 9/1991 | (JP) ........................ 528/59 |
| 3207782 | 9/1991 | (JP) ........................ 528/59 |

* cited by examiner

*Primary Examiner*—John J. Gallagher
(74) *Attorney, Agent, or Firm*—Michael Leach

(57) ABSTRACT

A method for adhesively joining or sealing two substrates which comprises:

(1) applying at about 50° to 150° C. onto a substrate a solvent-free, moisture curable urethane hot melt adhesive composition comprising the polyisocyanate prepolymer reaction product of (a) a polyol and (b) a polyisocyanate;

(2) contacting the adhesive disposed on the substrate to a second substrate such that a green bond is formed, and (3) exposing the adhesive bond to ambient moisture causing a crosslinking reaction within the adhesive, thereby forming a moisture-cured bond. The improvement is characterized in that the polyisocyanate prepolymer is prepared by reacting a polyisocyanate with a functionality of at least 2 with a polyol with a functionality of at least 2, the reaction product comprising at least 90 wt % "perfect" prepolymer and less than 2 wt % unreacted isocyanate monomer and the prepolymer having a free NCO functionality ranging from 0.2 to 8 wt %.

22 Claims, No Drawings

HOT MELT ADHESIVES COMPRISING LOW FREE MONOMER, LOW OLIGOMER ISOCYANATE PREPOLYMERS

CROSS-REFERENCE TO RELATED APPLICATIONS

This application is a continuation of application Ser. No. 08/707,832 filed Sep. 6, 1996, now abandoned.

TECHNICAL FIELD OF THE INVENTION

The present invention relates to extrudable moisture cure hot melt urethane adhesives comprising a urethane prepolymer.

BACKGROUND OF THE INVENTION

Hot melt adhesives and moisture cure urethane adhesives are well known generic adhesive classes. Hot melt adhesives generally comprise thermoplastic materials which can be conveniently applied by extruding the adhesive composition at elevated temperatures onto a workpiece to which it is desired to fix another workpiece. The adhesive bond increases in integrity as the composition cools. Hot melt adhesives generally have good green strength, i.e., initial strength before complete setting of the bond, and they have the additional benefits of being easy to handle and free of solvents which must be evacuated during the setting or curing process of the adhesive. However, hot melt adhesives have the drawback that after cooling to form a bond line, the thermoplastic compositions can be temperature sensitive. In other words, the bonding mass can lose bond strength as the temperature of the workpiece and the bond line increase. Further, hot melt adhesives tend to be physically unstable in the presence of hydrocarbon solvents and some organic compositions.

In contrast, many curable urethane adhesives have little green strength. Thus, after the application of a curable urethane adhesive, the structure to be bonded must be externally supported until the urethane can cure to a strong, resilient, highly crosslinked bond line. Additionally, solvents may be used in these adhesives which may need to be evaporated during cure. However, once cured, these urethane adhesives have high tensile strength and have little or no temperature sensitivity. They also offer good resistance to many solvents after cure.

Clearly, a single adhesive composition displaying both curing and hot melt properties is a desirable goal, since the resulting adhesive, in theory, could possess quick, high strength green bonding and strong, crosslinked cured adhesive bonding.

U.S. Pat. No. 4,623,709 discloses polyurethane prepolymers in which polyhydric alcohols are initially reacted with the faster reacting isocyanate group of an asymmetrical diisocyanate with the slowly reacting group remaining intact, after which the reaction products are combined with a symmetrical diisocyanate of which the equally reactive isocyanate groups again react more quickly than the slowly reacting groups of the first polyfunctional isocyanate compound. The products obtained by this process are allegedly distinguished by a low residual monomer content.

U.S. Pat. No. 5,441,808 discloses hot melt adhesive compositions combining the characteristics of thermoplastic hot melt adhesives and reactive adhesives and are prepared by blending a polyester polyether thermoplastic elastomer with a polyisocyanate prepolymer.

U.S. Pat. No. 3,931,077 discloses reactive, high viscosity hot melt adhesive compositions comprising a specific high viscosity reactive urethane prepolymer, a specific ethylene-vinyl acetate thermoplastic polymer and a phenolic or abietic acid-type tackifying resin.

U.S. Pat. No. 4,585,819 discloses the combination of an isocyanate prepolymer, a thermoplastic polyurethane or polyester and a synthetic resin which may be a ketone resin, a hydrogenation product of acetophenone condensation resins, and mixtures thereof.

U.S. Pat. No. 4,775,719 discloses a thermally stable, hot melt moisture cure polyurethane adhesive composition comprising an ethylene-vinyl monomer having an ethylene content of 55 wt % or less, a polyisocyanate prepolymer, and an aromatic tackifying resin.

U.S. Pat. No. 4,808,255 discloses a thermally stable, moisture cure urethane hot melt adhesive comprising a thermoplastic polymer, a compatible, curing urethane polyalkylene polyol prepolymer, and a tackifying agent.

U.S. Pat. No. 4,820,368 discloses a thermally stable, moisture cure urethane hot melt adhesive comprising a thermoplastic polymer, a compatible, curing urethane polyester polyol prepolymer, and a tackifying agent.

SUMMARY OF THE INVENTION

The present invention provides an improved moisture curable urethane hot melt adhesive composition having low melt viscosities and good green strength. Also provided is a method for adhesively joining or sealing two substrates using such adhesive composition. The method generally comprises (1) applying onto a substrate a solvent-free, moisture curable urethane hot melt adhesive composition comprising the polyisocyanate prepolymer reaction product of (a) a compound containing at least two active hydrogen atoms according to the Zerewittenoff test, preferably a polyol, and (b) a polyisocyanate, the adhesive composition being applied at an elevated temperature sufficient to melt extrude the adhesive composition;

(2) contacting the melt extruded adhesive composition disposed on the substrate to a second substrate such that a green bond is formed; and (3) exposing the adhesive bond to moisture causing a crosslinking reaction within the adhesive, thereby forming a moisture-cured bond.

According to the present invention, the prepolymer used in the moisture curable hot melt adhesive composition is prepared by reacting a polyisocyanate having an NCO functionality of at least 2 with a compound containing X active hydrogen atoms according to the Zerewittenoff test (where X is at least two), preferably a polyol having an OH functionality of at least 2, the prepolymer containing free NCO ranging from 0.2 to 8 wt % and less than 2 wt % unreacted isocyanate monomer. At least 90 wt %, preferably 95 wt %, of the prepolymer reaction product obtained by the reaction of the polyisocyanate with the active hydrogen-containing compound should comprise a prepolymer of X moles polyisocyanate per mole of such active hydrogen-containing compound, i.e., a "perfect" prepolymer. In the preferred embodiment, at least 90 wt %, preferably 95 wt %, of the prepolymer reaction product obtained by the reaction of toluenediisocyanate (TDI) with a long chain polyol having three OH groups comprises a "perfect" prepolymer of 3 moles TDI per mole long chain polyol.

Advantageously, the adhesive composition comprising such prepolymer is a low viscosity liquid at the application temperature and forms a solid upon cooling which serves to adhere the two substrates brought into contact with it. Subsequently, the prepolymer reacts with ambient moisture to form a crosslinked polyurethane-urea with improved strength and durability.

Compared to the conventional urethane prepolymers of the prior art, the present prepolymers exhibit lower viscosity at application temperature which results in better wetting and adhesion to substrates. In addition, the lower viscosity also allows the applicator to use lower processing temperatures which expands the number and type of substrates that can be adhered. The significantly lower monomer content results in reduced potential for worker exposure. A more regular resin structure in the prepolymer will result in more rapid crystallization and "green strength" development.

Moreover, the lower oligomer/monomer content upon crosslinking results in a more uniform network structure with improved properties relative to conventional materials.

DETAILED DESCRIPTION OF THE INVENTION

The moisture curable urethane hot melt adhesive composition used in the present inventive method comprises an NCO-terminated urethane prepolymer (also called a polyisocyanate prepolymer) prepared by reacting a polyisocyanate having an NCO functionality of at least 2 with a compound containing at least two active hydrogen atoms according to the Zerewittenoff test, preferably performing the reaction in an NCO to active hydrogen equivalent ratio of $\geq 4:1$, preferably, 6–8:1. The unreacted polyisocyanate monomer in the prepolymer reaction product is removed by distillation or other treatment to a concentration of less than 2%, preferably, less than 0.1%. The prepolymer reaction product should contain free isocyanate, i.e., free NCO functionality, ranging from 0.2 to 8 wt %, preferably, 0.5 to 3 wt %.

Such prepolymers useful in the hot melt adhesive composition may be prepared according to the teachings of U.S. Pat. No. 4,786,703, which disclosure is incorporated by reference. One device useful for stripping unreacted isocyanate monomer is a wiped film evaporator.

Exemplary of compounds containing at least two active hydrogen atoms according to the Zerewittenoff test are those compounds containing $\geq 2$ OH, NH and/or SH functionalities, especially a polyol. Thus, in the preferred embodiment, a polyol having an OH functionality of at least 3 is reacted with a diisocyanate in an NCO to OH equivalent ratio of $\geq 4:1$, preferably, 6–8:1.

The prepolymer reaction products are prepared using suitable organic polyisocyanates well known in the art including, for example, hexamethylene diisocyanate, phenylene diisocyanate, toluene diisocyanate (TDI) and 4,4'-diphenylmethane diisocyanate (MDI). Especially suitable are the 2,4- and 2,6-TDIs individually or together as their commercially available mixtures with the percentages being from about 65–100% of the 2,4- and 0–35% of the 2,6-isomer by weight. Other suitable isocyanate mixtures of diisocyanates known commercially as "crude MDI", also known as PAPI, which contain about 60% MDI along with other isomeric and analogous higher polyisocyanates.

Polyether and polyester polyols are normally used in the preparation of polyurethane prepolymers. The hydroxyl-terminated polyethers are typically polyalkylene ether glycols, such as poly(ethylene ether) glycol, poly(propylene ether) glycol and polytetramethylene ether glycol. Other polyethers are prepared by the copolymerization of cyclic ethers, such as ethylene oxide, propylene oxide and trimethylene oxide with various aliphatic diols such as ethylene glycol, butane diols, e.g., 1,3- and 1,4-butane diols, and the like. Polyester polyols can also be used for producing the polyurethane prepolymers, and these would include hydroxyl terminated polyesters such as ethylene adipate, polypropylene adipate, polyhexamethylene adipate and copolyesters prepared by copolymerizing ethylene glycol and propylene glycol with the above polyesters, which include poly(1,4-butylene-ethylene) adipate and poly(1,4-butylene-propylene) adipate.

The above polyether and polyester polyols are conventional for producing polyurethane prepolymers and can be blended such that the polyol composition (single or blend) used in making the prepolymer typically has an average Mn ranging from about 1000 to 60,000, and typically from 4200 to about 25,000.

The preferred prepolymers suited for use in the hot melt adhesive composition are prepared by reacting toluenediisocyanate (TDI) with a long chain triol in such a way to minimize by-product formation and, thereby, produce a prepolymer which is essentially "perfect" in terms of a stoichiometric TDI to polyol ratio, i.e., 3:1.

In the preferred prepolymer synthesis, it is important to maintain a high equivalent ratio of TDI to the polyol, e.g., a range from 4 to 20:1. As the level of TDI to polyol approaches 4:1 and then stoichiometric, greater quantities of higher molecular weight oligomers are formed which detract from the performance characteristics of the moisture-curable urethane prepolymer adhesive composition. Preferably, the equivalent ratio of TDI to polyol in the reaction is from 6 to 8:1 equivalents of TDI to polyol to produce oligomers at less than 10 wt %, preferably less than 2 wt %.

The prepolymers should have a reacted isocyanate content substantially that of the stoichiometric equivalent ratio of TDI to polyol, i.e., 2:1. This objective is achieved by maintaining a high isocyanate to polyol equivalent ratio at moderate temperatures. Maintaining a high equivalent ratio of feed TDI to polyol is extremely important because when the equivalent ratio of TDI to polyol is lowered to slightly above stoichiometric, e.g., 10% excess, which is conventional, oligomers are formed. Higher oligomer formation results in lower performance properties and higher prepolymer viscosity. A lower level of reacted isocyanate in the prepolymer diminishes the performance properties in the hot melt adhesive because it reduces the quantity of moisture that can be reacted with the prepolymer to produce the cured adhesive.

Ideally, in the preparation of a prepolymer for use in this invention, the actual isocyanate content should be at least 90%, and preferably, at least 95% of the stoichiometric level of isocyanate for a "perfect" prepolymer, e.g., a 2:1 equivalent ratio of TDI to polyol. Levels of reacted TDI below about 95%, and particularly below about 90% of stoichiometric, are direct evidence of TDI by-product formation and/or oligomer formation.

During the removal of unreacted TDI from the prepolymer reaction product, the temperature should be maintained as low as possible to avoid reaction of the free TDI with the prepolymer. Substantial oligomer formation and other side reactions can occur during this removal phase. For this reason if distillation techniques are used to remove free TDI, the wiped film distillation technique, optionally using a countercurrent inert gas sweep, should be considered to avoid oligomerization during prepolymer purification.

For process efficiency, it is preferred that the isomers of TDI reacted are within the same weight ratio as are present within the commercial supply. This reacted isomer level is achieved by utilizing a higher concentration of 2,6-TDI in the feed than is normally present, since the 2,6-isomer has a lower reactivity than the 2,4-TDI isomer, and recycling excess back to the reactor as feed. Since the degree of reacted 2,4- and 2,6-TDI is a function of the concentration of each isomer in the feed, the feed to the reactor should have a 2,6-TDI content from 50 to 60% to produce the reacted level of 20–30 wt % of the reacted TDl.

In addition to the polyisocyanate prepolymer, the urethane hot melt adhesive composition can optionally contain other thermoplastic components which will not detrimentally affect the adhesive character of the composition. Representative examples of such thermoplastic components include the thermoplastic polymers described in U.S. Pat. No. 5,441,808 and other compatible vinyl polymers such as vinyl acetate-ethylene copolymers, ethylene-vinyl acetate and vinyl alcohol copolymers; ethylene acrylic compounds including ethylene acrylate copolymers, ethylene methacrylate, ethylene butylacrylate, and ethylene hydroxyethylacrylate; polyamides; polyolefins; and polyesters. Preferably, the thermoplastic components comprise a vinyl polymer, a vinyl acetate-ethylene copolymer, or mixtures thereof.

To improve the tack, and to impart pressure-sensitive qualities to the adhesive, a tackifier may be incorporated into the adhesive composition. This tackifier may be a rosin ester, an aromatic resin, or mixtures thereof. Representative examples of rosin esters which are useful in the present invention include glycerol rosin ester, pentaerythritol rosin ester and hydrogenated versions of the above. Representative examples of aromatic resins include α-methyl styrene resin, polystyrene, coumorone, indene, and vinyl toluene. Preferably, the tackifier is an aromatic resin, and more preferably, it is a styrene resin. Most preferably, the tackifier is α-methyl styrene resin.

Fillers may be incorporated into the adhesive composition in the form of particulate matter, fibers or powders. These fillers may be any filler materials which will not interfere with the other components in the adhesive composition. Types of fillers include calcium carbonate, ceramics, glass, silica, quartz, mica, treated clay, titanium dioxide, boron nitrides, graphite, carbon black, asbestos, metals, barium sulfate, talc or mixtures thereof. Preferred fillers include calcium carbonate, silica, clay, carbon black or mixtures thereof.

Plasticizers may also be incorporated in the adhesive composition of the present invention. The plasticizer may be any composition which does not interfere with the efficacy of the other components and which facilitates processing and increases toughness and flexibility of the adhesive composition. Representative plasticizers include liquid aromatic ester plasticizers, including dioctyl phthalate esters; solid plasticizers, including dicyclohexyl phthalate, cyclohexane dimenthanol dibenzoate; and the plasticizers available under the SANTICIZER trademark from Monsanto.

In addition to the above indicated optional components, various other compounds may be added to the adhesive composition. These compounds include catalysts, dyes, inhibitors, antioxidants, UV absorbers, waxes, adhesion promoters (e.g., silane), and other conventional additives.

The isocyanate prepolymer is present at about 5 to 100 wt % of the adhesive composition. Preferably, it is present at about 25 to 100 wt %, and most preferably, at about 50 to 100 wt %.

The thermoplastic polymer portion of adhesive composition is present from 0 to about 80 wt % of the adhesive composition, preferably 0 to 50 wt %.

The tackifier is used at about 0 to 60 wt %, preferably from about 0 to 40 wt %.

Silane may be incorporated in the composition for certain applications and be present at about 0 to about 2 wt %, preferably about 0 to about 1 wt %. Additionally, a filler may be present at about 0 to about 50 wt %, plasticizer at about 0 to 10 wt %, wax at about 0 to 40 wt % and a catalyst at about 0 to 1 wt %.

There are numerous methods for the preparation of the adhesive compositions of the present invention. Many of these will be obvious to those skilled in the art. One such variation is that the prepolymer may be prepared separately or simultaneously with the preparation of the adhesive composition.

For use as an adhesive or sealant, the solid composition can be placed in a drum or pail, and platen-type dispensing equipment can be used to deliver the adhesive. The adhesive composition is extruded at a temperature that is at least sufficient to melt extrude the adhesive composition onto a substrate, e.g., about 50° to about 150° C. Prior to moisture cure of the adhesive, a second substrate is contacted with the adhesive. The adhesive exhibits sufficient green strength such that external mechanical support is not needed while the adhesive moisture cures. Substrates suitable for use with the adhesive of the present invention include glass, metal, polycarbonate, acrylic, ABS, PVC, vinyl, wood and the like., The reactive hot melt urethane adhesive composition is cured in the bond line by relying on the presence of ambient moisture, such as the moisture in the atmosphere or in the substrate, particularly moisture in wood. Another means of curing the bond line involves the addition of active compounds to the adhesive at the bond line which have an available active hydrogen atom for reacting with the NCO groups of the prepolymer. A variety of reactive compounds having free active hydrogens are known in the art, including hydrogen sulfite, polyols, amines, ammonia, and other active compounds.

EXAMPLE 1

A polyisocyanate prepolymer is prepared by reacting one equivalent of a 3.0 functional trimethylolpropane modified ethylene adipate (OH#=14) with 8 equivalents of 2,4/2,6-TDI (50/50 wt % ratio) at 50° C. until all hydroxyl functionality is consumed. Secondary processing steps such as wiped film evaporation are used to remove the unreacted TDI monomer to a level of $\leq 0.1$ wt % and produce a prepolymer resin with total free isocyanate content of approximately 1%.

When heated to 80° C., the resulting material would exhibit good melt flow, absence of gels and good wetting on a variety of surfaces. Bonded assemblies prepared using this urethane prepolymer would exhibit good green strength and high final properties as determined by standard adhesive tests.

The corresponding conventional materials prepared at $\leq 3$ equivalents isocyanate groups per equivalent hydroxyl groups would be either too viscous or nonhomogeneous (due to gel formation) and could not be processed as hot melt adhesives. These materials also would contain monomeric diisocyanate levels in excess of 2 wt %.

STATEMENT OF INDUSTRIAL APPLICATION

The present invention provides a method for bonding two substrates using a moisture-curable urethane hot melt adhesive composition.

We claim:

1. A method for adhesively joining or sealing two substrates which comprises:
    (1) applying onto a substrate a solvent-free, moisture curable urethane hot melt adhesive composition comprising the polyisocyanate prepolymer reaction product of (a) a polyether or polyester polyol containing X OH groups (where X is at least 2), and (b) a polyisocyanate having an NCO functionality of at least two, the adhesive composition being applied at an elevated temperature sufficient to melt extrude the adhesive composition;
    (2) contacting the melt extruded adhesive disposed on the substrate with a second substrate such that a green bond is formed, and
    (3) exposing the adhesive bond to moisture causing a crosslinking reaction within the adhesive, thereby forming a moisture-cured bond, characterized in that the polyisocyanate prepolymer reaction product consists essentially of at least 90 wt % of a prepolymer having a polyisocyanate to polyol stoichiometry of X:1, the prepolymer reaction product containing less than 2 wt % unreacted polyisocyanate monomer and the prepolymer containing free NCO ranging from 0.2 to 8 wt %.

2. The method of claim 1 in which the prepolymer reaction product consists essentially of at least 95 wt % of a prepolymer having a polyisocyanate to polyol stoichiometry of X:1.

3. The method of claim 1 in which X equals 2.

4. The method of claim 1 in which X equals 3.

5. The method of claim 1 in which the prepolymer reaction product contains less than 0.1 wt % unreacted polyisocyanate monomer.

6. The method of claim 5 in which the prepolymer contains free NCO ranging from 0.5 to 3 wt %.

7. The method of claim 1 in which the adhesive composition is applied to the first substrate at 50° to 150° C.

8. The method of claim 1 in which the polyisocyanate is toluene diisocyanate.

9. The method of claim 1 in which the polyisocyanate and polyol are reacted in an NCO to OH equivalents ratio of 6–8:1.

10. The method of claim 1 in which the hot melt adhesive composition applied to the first substrate comprises 5–100 wt % polyisocyanate prepolymer, 0–80 wt % thermoplastic polymer, 0–60 wt % tackifier, 0–2 wt % silane, 0–50 wt % filler, 0–10 wt % plasiticizer and 0–40 wt % wax.

11. A method for adhesively joining or sealing two substrates which comprises:
    (1) applying onto a substrate a solvent-free, moisture curable urethane hot melt adhesive composition comprising the polyisocyanate prepolymer reaction product of (a) a polyether or polyester polyol containing X OH groups (where X is 2 or 3), and (b) a diisocyanate, the adhesive composition being applied at 50° to 150° C.,
    (2) contacting the melt extruded adhesive disposed on the substrate with a second substrate such that a green bond is formed, and
    (3) exposing the adhesive bond to ambient moisture causing a crosslinking reaction within the adhesive, thereby forming a moisture-cured bond, characterized in that the polyisocyanate prepolymer reaction product consists essentially of at least 90 wt % of a prepolymer having a diisocyanate to polyether or polyester polyol stoichiometry of X:1 and prepared by reacting the diisocyanate and polyol in an NCO to OH equivalents ratio of 6 to 20:1, the prepolymer reaction product containing less than 2 wt % unreacted diisocyanate monomer and the prepolymer having free NCO ranging from 0.2 to 8 wt %.

12. The method of claim 11 in which the prepolymer reaction product comprises at least 95 wt % of a prepolymer having a diisocyanate to polyether or polyester polyol stoichiometry of X:1.

13. The method of claim 12 in which X equals 2.

14. The method of claim 12 in which X equals 3.

15. The method of claim 12 in which the prepolymer reaction product contains less than 0.1 wt % unreacted diisocyanate monomer.

16. The method of claim 12 in which the prepolymer contains free NCO ranging from 0.5 to 3 wt %.

17. The method of claim 11 in which the diisocyanate is toluene diisocyanate.

18. The method of claim 12 in which the diisocyanate and the polyol are reacted in an NCO to OH equivalents ratio of 6–8:1.

19. The method of claim 11 in which the hot melt adhesive composition applied to the first substrate comprises 5-100 wt % polyisocyanate prepolymer, 0-80 wt % thermoplastic polymer, 0–60 wt % tackifier, 0–2 wt % silane, 0–50 wt % filler, 0–10 wt % plasiticizer and 0–40 wt % wax.

20. A method for adhesively joining or sealing two substrates which comprises:
    (1) applying onto a substrate a solvent-free, moisture curable urethane hot melt adhesive composition comprising the polyisocyanate prepolymer reaction product of (a) a polyether or polyester triol and (b) toluene diisocyanate, the adhesive composition being applied at 50° to 150° C.,
    (2) contacting the melt extruded adhesive disposed on the substrate with a second substrate such that a green bond is formed, and
    (3) exposing the adhesive bond to ambient moisture causing a crosslinking reaction within the adhesive, thereby forming a moisture-cured bond, characterized in that the polyisocyanate prepolymer reaction product comprises at least 95 wt % of a prepolymer having a toluene diisocyanate to polyether or polyester triol stoichiometry of 3:1, the prepolymer reaction product containing less than 0.1 wt % unreacted toluene diisocyanate monomer and the prepolymer having free NCO ranging from 0.5 to 3 wt %.

21. The method of claim 20 in which the hot melt adhesive composition applied to the first substrate comprises 5–100 wt % polyisocyanate prepolymer, 0–80 wt % thermoplastic polymer, 0–60 wt % tackifier, 0–2 wt % silane, 0–50 wt % filler, 0–10 wt % plasiticizer and 0–40 wt % wax.

22. The method of claim 20 in which the hot melt adhesive composition applied to the first substrate comprises 25–100 wt % polyisocyanate prepolymer, 0–50 wt % thermoplastic polymer, 0–40 wt % tackifier, 0–1 wt % silane, 0–50 wt % filler, 0–10 wt % plasiticizer and 0–40 wt % wax.

* * * * *